United States Patent Office 3,580,829
Patented May 25, 1971

3,580,829
PROCESS FOR IRRADIATING POLYVINYLIDENE FLUORIDE AND A COMPATIBLE POLYFUNCTIONAL MONOMER AND PRODUCT THEREOF
Vincent L. Lanza, Atherton, Calif., assignor to Raychem Corporation, Menlo Park, Calif.
No Drawing. Continuation-in-part of applications Ser. No. 257,763, Feb. 11, 1963, and Ser. No. 403,328, Oct. 12, 1964. This application Mar. 1, 1968, Ser. No. 709,804
Int. Cl. C08d 1/00; C08f 15/00, 19/00
U.S. Cl. 204—159.17                                      24 Claims

ABSTRACT OF THE DISCLOSURE

A composition comprising polyvinylidene fluoride and a compatible polyfunctional monomer may be treated with low doses of irradiation to provide a crosslinked polyvinylidene fluoride having excellent strength properties, resistance to heat aging and the property of elastic memory.

This is a continuation-in-part of my copending applications Ser. No. 403,328, now abandoned, filed Oct. 12, 1964, and Ser. No. 257,763, filed Feb. 11, 1963, the latter of which is now abandoned.

BACKGROUND OF THE INVENTION

In recent years the technology concerned with the irradiation of various materials, particularly polymers, has made great strides and irradiated materials have found uses in a wide variety of environments. It has been found that some polymers such as polyethylene may be modified by irradiation so as to possess greater resistance to high temperatures and greater strength simply by subjecting them to irradiation with high energy electrons. An extremely important advance in this technology has been the discovery that the property of elastic memory could be imparted to certain irradiated polymers by the use of appropriate methods such as that disclosed in Cook et al. Pat. No. 3,086,242. However, not all polymers are equally susceptible to improvement by means of irradiation nor are all irradiated polymers equally susceptible to having the property of elastic memory imparted thereto.

Polyvinylidene fluoride is a polymer which presents certain serious problems in this regard. For example, as disclosed in Pat. No. 3,142,629, it has been found necessary to subject this polymer to relatively massive doses of irradiation, i.e., at least 8 megarads, to obtain significantly improved thermal resistance and strength properties. However, such massive doses of irradiation in addition to increasing the cost involved, improve some properties of the polymer only at the expense of producing other detrimental effects. Perhaps the most significant detrimental effect of massive doses of irradiation is degradation of the polymer. This degradation is readily noticeable by discoloration of the polymer and is believed to involve a breakdown of the polymer chain with consequent liberation of hydrogen fluoride. Degradation of the polymer renders it subject to many deficiencies which substantially decrease its usefulness including low resistance to heat aging due to increased vulnerability to oxidation. Furthermore, such degradation greatly reduces the suitability of the polymer for use in the process disclosed in Cook et al. Pat. No. 3,086,242.

SUMMARY OF THE INVENTION

Thus, it is a primary object of the present invention to provide a polyvinylidene fluoride elastic memory material which has been subjected to moderate doses of irradiation with high energy ionizing radiation sufficient to produce significant improvement in the strength properties thereof without substantial degradation.

It is a further object of the present invention to provide a process of irradiating a polyvinylidene fluoride composition at moderate irradiation doses of high energy ionizing radiation to substantially improve the strength properties thereof without substantially degrading the polymer and producing an elastic memory material from the irradiated polymer according to the process disclosed in Cook et al. Pat. No. 3,086,242.

It is still further an object of the present invention to provide a composition comprising polyvinylidene fluoride and triallyl cyanurate and the process of irradiating this composition with high energy ionizing radiation and producing an elastic memory material from the polymer.

These and other objects may be obtained according to the present invention which provides for the incorporation of a compatible polyfunctional monomer into polyvinylidene fluoride prior to irradiation with high energy ionizing radiation thereby producing a high degree of crosslinking with a minimal amount of irradiation.

DESCRIPTION OF PREFERRED EMBODIMENTS

The polyfunctional monomers which we have found to improve the degree of irradiation crosslinking of polyvinylidene fluoride are those polyfunctional monomers which are compatible with polyvinylidene fluoride, i.e., miscible with the polymer, and which are not so volatile that they will escape during processing.

Examples of compatible polyfunctional monomers are the polyallyl esters of carboxylic acids and other acid moieties such as cyanuric acid, e.g., triallyl cyanurate, diallyl aconitate, tetraallyl pyromellitate and triallyl isocyanurate; bis and tris maleimides, e.g., N,N'-ethylene-bis-maleimide and N,N' - m - phenylene - bis - maleimide; acrylic and methacrylic esters of polyhydric alcohols, e.g., dipentaerythritol hexamethacrylate; vinyl esters of polybasic acids, e.g., trivinyl cyanurate and trivinyl citrate; vinyl and allyl ethers of polyhydric alcohols, e.g., the tetraallyl ether of pentaerythritol and the tetravinyl ether of pentaerythritol; bis acrylamides, e.g., N,N'-methylene-bis-acrylamide and N,N'-p-phenylene-bis-acrylamide.

The polyfunctional monomers may have the same functionality or a mixture of functional groups on the same molecule. Additionally, mixtures of various polyfunctional monomers may be used in the polymer.

The amount of polyfunctional monomer used will depend upon the degree of crosslinking required and the effectiveness of the particular crosslinking agent. In general, the monomer should be present in an amount of at least about 0.05 part per hundred and preferably at least about 0.5 part per hundred. There is virtually no upper limit on the amount of polyfunctional monomer that can be added. However, 25 parts per hundred will generally be sufficient to obtain the desired properties and normally 10 parts per hundred is sufficient. With some polyfunctional monomers, it has been observed that the effectiveness in terms of increased modulus of elasticity can be greatly increased with rather small increases in concentration. However, the determination of optimum concentrations can be determined by routine variations which are within the skill of the art.

According to this invention, the compatible polyfunctional monomer is first incorporated into the polyvinylidene fluoride. The monomer may be incorporated by blending, mixing or by diffusing the monomer into the solid polyvinylidene fluoride. An effective diffusion method comprises diffusion blending disclosed in my application Ser. No. 257,763, filed Feb. 11, 1963, now abandoned, the disclosure of which is incorporated herein by reference. The composition comprising the polyvinylidene fluoride and the polyfunctional compatible monomer may then be formed into a shaped article. For example, the polymer may be molded or extruded in the form of a tube. High energy ionizing radiation, e.g., high energy electron radiation, will then cause sufficient crosslinking to enable the article to be deformed, e.g., expanded in the case of a tube, according to the process of Cook et al. U.S. Pat. No. 3,086,242, the disclosure of which is incorporated herein by reference. Distortion of the article and cooling while in the distorted state imparts the property of elastic memory to the article.

A dose of 8 megarads or less is normally desired and it is preferred that the dose be limited to about 5 megarads or less.

The present invention is further illustrated by the following examples in which all proportions are expressed in parts by weight.

table as megarads and the amount of monomer in parts per hundred by weight.

TABLE 1.—MELT STRENGTH OF IRRADIATED POLYVINYLIDENE FLUORIDE

| Additive | Level | Dose | Tubing modulus M100, longitudinal direction at 200° C. (p.s.i.) | Tubing modulus, measured as hoop p.s.i. at crystal- lation point | Slab modulus [1] | |
|---|---|---|---|---|---|---|
| | | | | | M100 | Ultimate |
| None | | 3 | 10 | 1 | | |
| | | 7 | 10 | 2 | | |
| Triallyl cyanurate | 3 | 2½ | | 7 | 108 | 135 |
| | | 5 | 120 | 15 | | |
| | | 7½ | 180 | 20 | | |
| | | 10 | 250 | 30 | | |
| | 5 | 2½ | 60 | 9 | 151 | 164 |
| | | 5 | 150 | 17 | | |
| | | 7½ | 195 | 28 | | |
| | | 10 | 250 | 40 | | |
| Diallyl phthalate | 5 | 5 | | 3 | 29 | 100 |
| | | 10 | | 5 | | |

[1] These values were obtained using the following formula:

$$\text{Slab modulus} = \frac{1.25 \text{ (Force at } 90\% \text{ elongation} - \text{Force at } 10\% \text{ elongation)}}{\text{Initial cross-sectional area}}$$

EXAMPLE I

Samples comprising pure polyvinylidene fluoride (Kynar 1900E) and this polyvinylidene fluoride combined with either triallyl cyanurate or diallyl phthalate were prepared. The monomers were incorporated into the polymer by means of the process disclosed in my application Ser. No. 257,763, now abandoned, by pouring the monomer into powdered polymer in a Henschel blender and then operating the blender at 3000 r.p.m. for about three minutes. These compositions were then extruded through an extruder having a head temperature of 440° F. to form a rod which rod was then chopped into chips. These chips were then extruded into a tubing in an extruder having a head temperature of 510° F. The inside diameter of the tubing was controlled by means of air pressure introduced in the extruder head.

The extruded tubing was then irradiated with high energy electrons generated by a 1 mev. beam. The irradiated tubing was then subjected to strength tests. The strength of such material is usually obtained by plotting stress vs. strain for a length of tubing held in the melt. In addition to a conventional modulus measurement made in the longitudinal direction of the tubing, hoop strength measurements were made by applying pressure to the inside of a section of tubing heated above the melting point and then measuring the increase in diameter upon cooling. This modulus, referred to herein as the tubing modulus measured as hoop pressure, has been obtained by calculating $PD/ta$ where $P$=pressure inside the tubing in p.s.i., $D$=initial inside diameter of the tube in inches, $t$=initial wall thickness of the tubing in inches and $a$=inside diameter of expanded tubing divided by initial inside diameter. This modulus gives an excellent indication of the suitability of the polymer for use in the process of Cook et al. Pat. No. 3,086,242. The results of these measurements are indicated in the following table. The M100 values were obtained at 100% elongation. Dose is expressed in this

EXAMPLE II

Polyvinylidene fluoride tubing containing three parts per hundred of triallyl cyanurate was prepared in the manner described in Example I and was irradiated to a dose of 7 megarads. This tubing had an inside diameter of 0.08 inch and an outside diameter of 0.10 inch. A 5-inch length of the irradiated tubing was placed in a bath of glycerine and held at a temperature of 350° F. for three minutes before being removed and cooled in water. Measurement after removal showed an inside diameter of 0.084 and an outside diameter of 0.106 inch and a length shrinkage of 12%. The same test performed on unirradiated tubing showed a large increase in inside and outside diameter together with a longitudinal shrinkage of about 70%.

The irradiated tubing having an inside diameter of 0.08 inch and an outside diameter of 0.10 inch was expanded in the manner described in Cook et al. Pat. No. 3,086,242 using a glycerine heating bath having a temperature of 350° F., an internal pressure of 15 pounds, an external pressure of 13.5 pounds and a speed of 25–30 feet per minute. The 12% longitudinal shrinkage was balanced by feeding the material to the expansion die faster than it passed therethrough. Upon cooling in water, the inside diameter after expansion was 0.196 inch. The expanded tubing was then placed in a circulating air oven at a temperature of 200° C. for three minutes. Upon removal and cooling the inside diameter was 0.086 inch and the longitudinal shrinkage was 2.5% thereby demonstrating that a highly satisfactory elastic memory material had been produced.

Slab modulus (M100) measurements made on other samples prepared in the manner described in Example I were made. These specimens were irradiated to a dose of 7 megarads before the measurements were made. It was found that three parts per hundred of diallyl phthalate produced a modulus of 50 while 15 parts per hundred of diallyl chloromethylphosphate resulted in a modulus of 87 and the same amount of diallyl benzene phosphate resulted in a modulus of 16. Three parts per hundred of a similar monomer available commerically under the same Santoset I resulted in a modulus of 14. In marked contrast, three parts per hundred of triallyl cyanurate resulted in a modulus of 108.

EXAMPLE III

This example illustrates the crosslinking achieved by use of various other polyfunctional monomers within the scope of the present invention. The samples tested were prepared by fluxing polyvinylidene fluoride at 200° C. in a Brabender Plastograph. The desired amount of monomer was added to the fluxed polyvinylidene fluoride and mixed for about 45 seconds. Slabs having a thickness of about 20 mils were then pressed at 200° C., subjected to varying degrees of irradiation and then annealed at 150° C. An exception to the above procedure was the preparation of dipentaerythritol hexamethacrylate containing slabs. There, monomer was added to powdered polyvinylidene fluoride by means of solvent, the solvent evaporated and the slab pressed. The resulting irradiated slabs were then analyzed to determine modulus of elasticity, ultimate strength at 200° C. and the insoluble fraction after extraction with boiling dimethyl acetamide.

The modulus of elasticity at 200° C. was determined by statically loading strips of the polymer and measuring the strain. The initial slope of the resulting stress-strain curve was taken as the elastic modulus. The ultimate strengths were calculated using the initial cross-sectional area. The results are set forth in the following table.

trivinyl cyanurate, triallyl cyanurate and triallyl isocyanurate.

5. The composition of claim 1 wherein said monomer is selected from the group consisting of N,N'-methylene-bis-acrylamide, N,N' - ethylene-bis-acrylamide, N,N'-ethylene-bis-maleimide and N,N'-m-phenylene-bis-maleimide.

6. The composition of claim 2 wherein said monomer is selected from the group consisting of N,N'-methylene-bis-acrylamide, N,N'-ethylene-bis-acrylamide, N,N'-ethylene-bis-maleimide and N,N'-m-phenylene-bis-maleimide.

7. The composition of claim 1 wherein said monomer is selected from the group consisting of dipentaerythritol hexamethacrylate and tetravinyl pentaerythritol.

8. The composition of claim 2 wherein said monomer is selected from the group consisting of dipentaerythritol hexamethacrylate and tetravinyl pentaerythritol.

TABLE 2

| Monomer Type | Phr. | Modulus[1] (p.s.i.) at 200° C. with irradiation dosage (Mrads) at— | | | | | Ultimate strength at 200° C. with irradiation dosage (Mrads) at— | | | | | Gel fraction (percent) after irradiation dosage (Mrads) at— | | | |
|---|---|---|---|---|---|---|---|---|---|---|---|---|---|---|---|
| | | 0.0 | 2.5 | 5.0 | 7.5 | 10.0 | 0.0 | 2.5 | 5.0 | 7.5 | 10.0 | 2.5 | 5.0 | 7.5 | 10.0 |
| None | | 23.0 | 36 | 44 | 58.5 | 64 | 22.1 | 89 | 117 | 180 | 220 | 44.6 | 54.7 | 60.0 | 64.3 |
| Diallyl aconitate | 3 | 9.5 | 86 | 132 | 242 | 307 | 11.5 | 194 | 281 | 301 | 257 | 63.0 | 75.7 | 81.4 | 84.5 |
| | 5 | 6.7 | 94 | 176 | 425 | | 8.9 | 191 | 317 | 305 | | 62.6 | 75.4 | 82.2 | 86.4 |
| Triallyl isocyanurate | 3 | 10.7 | 88 | 297 | 380 | 380 | 12.0 | 188 | 307 | >300 | | 67.1 | 89.8 | 88.8 | 89.4 |
| | 5 | 8.9 | 99 | 340 | 650 | | 9.7 | 216 | >273 | >200 | | 67.0 | 84.4 | 91.1 | 91.6 |
| Triallyl cyanurate | 3 | 10.5 | 63 | 118 | 342 | 400 | 12.0 | 172 | 259 | 280 | 169 | 58.6 | 74.8 | 84.2 | 86.4 |
| | 5 | 6.5 | 35 | 83 | 260 | 340 | 7.4 | 134 | 222 | 289 | 210 | 51.6 | 70.4 | 78.8 | 82.6 |
| Dipentaerythritol hexamethacrylate | 5 | | | 189 | | 234 | | | | | | | | | |
| m-Phenylene-bis-maleimide | 3 | | 62 | 128 | 168 | 206 | | | | | | | | | |
| Ethylene-bis-maleimide | 3 | | 100 | 140 | 180 | 320 | | | | | | | | | |
| | 5 | | 110 | 350 | 650 | 700 | | | | | | | | | |
| Diallyl phtalate | 3 | | | 49 | | 73 | | | | | | | | | |
| Tetraallyl pyromellitate | 3 | | | 105 | | 160 | | | | | | | | | |
| | 6 | | | 145 | | 244 | | | | | | | | | |

[1] Young's Modulus.

It is interesting to note that the values for diallyl phthalate at 3 phr., obtained subsequent to the filing of my application Ser. No. 403,328, now abandoned, indicate that diallyl phthalate is an effective crosslinking agent within the scope of this invention although the increase in modulus values are not as great as obtained with other monomers in the table.

Optimum monomer concentration can readily be determined by routine variations of concentration as illustrated by these examples. Similarly, the optimum irradiation dosage for different compositions may vary but can be readily determined. Thus, the preceding examples should not be considered as limiting but merely illustrative. The scope of the invention, therefore, is limited only by the lawful scope of the appended claims.

I claim:

1. A composition resistant to thermal degradation comprising a crosslinked mixture of polyvinylidene fluoride and a polyfunctional monomer compatible with polyvinylidene fluoride and selected from the group consisting of triallyl cyanurate, triallyl isocyanaurate, N,N'-ethylene-bis-maleimide, N,N'-m-phenylene-bis-maleimide, dipentaerythritol hexamethacrylate, trivinyl cyanurate, trivinyl citrate, tetravinyl pentaerythritol, N,N'-methylene-bis-acrylamide and N,N'-ethylene-bis-acrylamide, said mixture having been crosslinked by irradiation with high energy ionizing radiation.

2. The composition of claim 1 wherein said monomer is present in an amount of at least about 0.5% by weight and wherein the dosage of said radiation employed is from 2.5 to 10 megarads.

3. The composition of claim 1 wherein said monomer is selected from the group consisting of trivinyl citrate, trivinyl cyanurate, triallyl cyanurate and triallyl isocyanurate.

4. The composition of claim 2 wherein said monomer is selected from the group consisting of trivinyl citrate, 9. The composition of claim 1 wherein said monomer is triallyl cyanurate.

10. The composition of claim 2 wherein said monomer is triallyl cyanurate.

11. The composition of claim 2 wherein said monomer is triallyl isocyanurate.

12. The composition of claim 2 wherein said monomer is dipentaerythritol hexamethacrylate.

13. The composition of claim 2 wherein said monomer is N,N'-methylene-bis-acrylamide.

14. The composition of claim 2 wherein said monomer is N,N'-ethylene-bis-acrylamide.

15. A method of crosslinking polyvinylidene fluoride to obtain a polymer resistant to thermal degradation comprising adding to polyvinylidene fluoride a polyfunctional monomer compatible with polyvinylidene fluoride and selected from the group consisting of triallyl cyanurate, triallyl isocyanurate, N,N'-ethylene-bis-maleimide, N,N'-mephenylene-bis-maleimide, dipentaerythritol hexamethacrylate, trivinyl cyanurate, trivinyl citrate, tetravinyl pentaerythritol, N,N'-methylene-bis-acrylamide and N,N'-ethylene-bis-acrylamide, and irradiating the resulting mixture with high energy ionizing radiation.

16. The method of claim 15 wherein said monomer is present in an amount of at least about 0.5% by weight and wherein the dosage of said radiation employed is from 2.5 to 10 megarads.

17. The method of claim 15 wherein said monomer is selected from the group consisting of trivinyl citrate, trivinyl cyanurate, triallyl cyanurate and triallyl isocyanurate.

18. The method of claim 16 wherein said monomer is selected from the group consisting of trivinyl citrate, trivinyl cyanurate, triallyl cyanurate and triallyl isocyanurate.

19. The method of claim 15 wherein said monomer is selected from the group consisting of N,N'-methylenebis-acrylamide, N,N'-ethylene-bis-acrylamide, N,N'-ethylene-bis-maleimide and N,N'-m-phenylene-bis-maleimide.

20. The method of claim 16 wherein said monomer is selected from the group consisting of N,N'-methylene-bis-acrylamide, N,N'-ethylene-bis-acrylamide, N,N'-ethylene-bis-maleimide and N,N'-m-phenylene-bis-maleimide.

21. The method of claim 15 wherein said monomer is selected from the group consisting of dipentaerythritol hexamethacrylate and tetravinyl pentaerythritol.

22. The method of claim 16 wherein said monomer is selected from the group consisting of dipentaerythritol hexamethacrylate and tetravinyl pentaerythritol.

23. The method of claim 15 wherein said monomer is triallyl cyanurate.

24. The method of claim 16 wherein said monomer is triallyl cyanurate.

References Cited

UNITED STATES PATENTS

| | | | |
|---|---|---|---|
| 3,137,674 | 6/1964 | Marans et al. | 260—45.5 |
| 3,142,629 | 7/1964 | Timmerman | 204—159.2 |

OTHER REFERENCES

Nature, Enhancement of Radiation Induced Cross-Linking of Polyvinyl Chloride, vol. 183, April 1959, pp. 1108–1109.

MURRAY TILLMAN, Primary Examiner

RICHARD B. TURER, Assistant Examiner

U.S. Cl. X.R.

260—884, 885